(12) United States Patent
Pors et al.

(10) Patent No.: US 7,461,618 B2
(45) Date of Patent: Dec. 9, 2008

(54) REFORMER MIXING CHAMBER AND METHOD FOR OPERATING SAME

(75) Inventors: Zdenek Pors, Jülich (DE); Anderas Tschauder, Westerkappeln (DE); Joachim Pasel, Jülich (DE); Ralf Peters, Würselen (DE); Detlef Stolten, Aachen (DE)

(73) Assignee: Forschungszentrum Julich GmbH, Julich (DE)

( * ) Notice: Subject to any disclaimer, the term of this patent is extended or adjusted under 35 U.S.C. 154(b) by 0 days.

(21) Appl. No.: 11/791,011

(22) PCT Filed: Nov. 12, 2005

(86) PCT No.: PCT/DE2005/002041

§ 371 (c)(1),
(2), (4) Date: May 17, 2007

(87) PCT Pub. No.: WO2006/053534

PCT Pub. Date: May 26, 2006

(65) Prior Publication Data

US 2008/0011250 A1    Jan. 17, 2008

(30) Foreign Application Priority Data

Nov. 17, 2004    (DE) ..................... 10 2004 055 425

(51) Int. Cl.
*F02B 47/02*    (2006.01)

(52) U.S. Cl. .................... 123/25 P; 123/3; 423/652; 422/211

(58) Field of Classification Search ............... 123/25 P, 123/25 R, 26, 3, 1 A; 423/652; 422/211; 44/412; 48/212

See application file for complete search history.

(56) References Cited

U.S. PATENT DOCUMENTS

| 6,045,772 | A | 4/2000 | Szydlowski et al. | |
| 6,561,139 | B2 * | 5/2003 | Guy | 123/26 |
| 6,660,050 | B1 * | 12/2003 | Dieckmann et al. | 44/412 |
| 6,872,379 | B2 * | 3/2005 | Zahringer et al. | 423/651 |
| 6,875,246 | B2 * | 4/2005 | Burch et al. | 48/61 |
| 6,921,516 | B2 * | 7/2005 | Goebel et al. | 422/191 |
| 2003/0033753 | A1 | 2/2003 | Zahringer et al. | |

FOREIGN PATENT DOCUMENTS

WO    WO 2005/097312 A1    10/2005

* cited by examiner

*Primary Examiner*—Stephen K. Cronin
*Assistant Examiner*—Hyder Ali
(74) *Attorney, Agent, or Firm*—Andrew Wilford

(57) ABSTRACT

Liquid fuel is evaporated and mixed with an oxidizing agent in a mixing chamber of a reformer by first introducing substantially only the liquid fuel in an axial downstream direction into a first upstream zone of the mixing chamber via a nozzle so as to atomize the liquid fuel. Then steam is separately introduced into the upstream zone and contacted with the atomized fuel to cause the fuel to evaporate. An oxidizing agent is then introduced downstream of the first zone in a second zone of the mixing chamber to the evaporated fuel and uniformly mixing the oxidizing agent with the evaporated fuel.

15 Claims, 4 Drawing Sheets

REFORMER MIXING CHAMBER AND METHOD FOR OPERATING SAME

CROSS REFERENCE TO RELATED APPLICATIONS

This application is the US national phase of PCT application PCT/DE2005/002041, filed 12 Nov. 2005, published 26 May 2006 as WO 2006/053534, and claiming the priority of German patent application 102004005425.0 itself filed 17 Nov. 2004, whose entire disclosures are herewith incorporated by reference.

FIELD OF THE INVENTION

The invention relates to an effective mixing chamber for a reformer, in particular a reformer for producing middle distillates, and a method for operating the mixing chamber.

PRIOR ART

Autothermic reforming represents a promising alternative to classical steam reforming for the production of hydrogen. In the process, an oxygen-water mixture is reacted with $C_nH_m$ hydrocarbon in a reactor without an external heat source, in accordance with the following equations:

$$C_nH_m + nH_2O \rightarrow nCO + (m/2+n)H_2 \quad \Delta H_R > 0 \text{ (Steam reforming)}$$

$$C_nH_m + n/2 O_2 \rightarrow m/2 H_2 + nCO \quad \Delta H_R < 0 \text{ (Partial Oxidation)}$$

For methane, $CH_4$ (n=1, m=4), the reaction equations are as follows:

$$CH_4 + H_2O \rightarrow CO + 3H_2 \quad \Delta H_R = +206 \text{ kJ/mol}$$

$$CH_4 + 0.5 O_2 \rightarrow CO + 2H_2 \quad \Delta H_R = -35 \text{ kJ/mol}$$

Oxygen is generally provided by air. The heat necessary for steam reforming is supplied by the partial oxidation of the hydrocarbon. The process may therefore be carried out in an autothermic operating mode. In principle, higher efficiency is achievable since system-related enthalpy losses are possible only via the hot product gas stream. Autothermic reforming appears very promising, in particular for the use of fuel cell systems as a vehicle drive, with gasoline or diesel as fuel. This may be accounted for by the high reaction temperature (approximately 800° C.) and good reaction kinetics.

In addition to the development of suitable catalysts for autothermic reforming of middle distillates, the operational capability of a reformer depends essentially on whether optimized operating conditions can be established. Reforming liquid fuel places high demands on preparation of the starting materials before they enter the reaction zone of the reactor, i.e. the reformer.

Poor quality of the starting material mixture consistently has a detrimental effect on the conversion of the fuel. To avoid soot formation and so-called "hot spots" in the reaction zone, it is particularly important that the $O_2/C$ and $H_2O/C$ ratios remain as constant as possible with no fluctuation. The mixing chamber of a reformer therefore has the following functions:

supplying fuel,
atomizing and evaporating fuel,
forming a mixture (homogenizing the fuel concentration in the air-vapor stream), and
homogenizing the flow distribution (flow rate profile).

In principle, two possibilities for supplying the fuel are known from the prior art: gaseous feed via an external evaporator and internal injection and atomization of the liquid fuel. For pure substances such as methanol or isooctane, the fuel is frequently evaporated separately. For more complex fuel mixtures such as gasoline or diesel, there is an increased risk of formation and deposition of carbonaceous deposits on the hot surface of the evaporator. In these methods it is disadvantageous that an additional external heat source is required, and process control has consistently proven to be difficult on account of the thermal capacity of the evaporator.

Direct injection of the fuel is usually carried out using a single-component or multi-component nozzle. In a single-component nozzle the fuel is atomized under high pressure. Examples of suitable single-component nozzles are the continuous swirl pressure atomizing nozzle, which is commonly used in smaller heater furnaces using heating oil, or the high-pressure injector, which is used in current gasoline and diesel engines. Also mentioned is the Venturi tube, which is used for drawing up and atomizing a liquid.

When a multi-component nozzle is used, the fuel is generally atomized in combination with a gas stream. Such nozzles generate very fine droplets having a diameter of approximately 10 to 30 μm. Three-component nozzles are also known in which, in addition to the liquid fuel and air, superheated steam is fed through the nozzle.

Complete evaporation of the atomized fuel requires considerable heat, which is supplied, for example, by a hot gaseous starting product stream of air and/or steam. However, it is important to note that under certain conditions the gas stream temperature necessary for evaporation may exceed the ignition temperature of the fuel.

Alternatively, the necessary heat may be provided by partial combustion of the fuel, or by heating the mixing chamber using an external heater.

In all of the above-referenced methods, however, due to decomposition of the fuel carbonaceous deposits may disadvantageously occur which precipitate in particular on the reforming catalyst in the form of soot, and thus result in increasingly diminished activity of the catalyst.

OBJECT OF THE INVENTION

The object of the invention is to provide a particularly effective mixing chamber for a reformer which allows a particularly uniform distribution of the starting materials and homogenization of the flow distribution, and which therefore may be operated in a particularly effective manner. A further object of the invention is to provide a mixing chamber which substantially prevents undesired soot formation and deposition on the reforming catalyst, and converts the fuel to the greatest extent possible in the subsequent reformer. It is yet another object that the mixing chamber may be used in particular for low-sulfur diesel and kerosene.

SUMMARY OF THE INVENTION

The invention is a mixing chamber in which a fuel and an oxidizing agent are mixed, and this mixture is subsequently supplied to a reformer catalyst. Such a mixing chamber could, for example, be part of an autothermic reformer (ATR). For a reformer, the mixing chamber according to the invention is composed of metal or ceramic.

Ceramic is advantageous since it generally requires less thermal insulation, but especially because when stainless steel is used, the nickel that is present may act as a catalyst and cause some undesired reactions. Such disadvantages may be avoided when ceramic is used.

The mixing chamber according to the invention has a supply line with a nozzle for liquid fuel, a supply line for steam, and a supply line for an oxidizing agent, in particular air. The mixing chamber may be divided into two zones, evaporation of the fuel and uniform distribution taking place in the first zone and intense and consistent mixing of the uniformly evaporated fuel with the oxidizing agent taking place in the second zone.

The supply line and the nozzle for the fuel and the supply line for the steam are provided n the first zone in such a way that the nozzle for the fuel is positioned adjacent the feed for the steam, so that the fuel that is injected and atomized inside the mixing chamber immediately evaporates in the hot steam.

Downstream from the introduced fuel and the steam at least one supply line for the oxidizing agent, preferably air, is provided at the boundary of the second zone of the mixing chamber. The supply line may advantageously have multiple outlets, preferably in the form of a nozzle ring. It has been found that a pronounced turbulence profile is necessary to achieve rapid mixing and good mixing quality. A constriction is provided in the vicinity of the supply line to allow the gases to be mixed at the highest possible velocity. The oxidizing agent is advantageously supplied radially from multiple narrow openings. However, the principle is expressly not that of a Venturi tube.

In the method according to the invention for operating the mixing chamber, only the water is thermally pretreated, i.e. evaporated and superheated. This steam is introduced into the first zone of the mixing chamber in particular at a temperature ranging from 350° C. to 500° C. The fuel, which is injected via a nozzle into the first zone in a cold state, i.e. at room temperature, for example, evaporates instantaneously. The steam atmosphere in the first zone advantageously prevents carbon formation. The temperature of the first zone of the mixing chamber during operation is at least 50 K higher than the boiling temperature of the fuel.

In a further design of the mixing chamber, the mixing chamber is shaped as a cylinder that tapers in the direction of the nozzle for the fuel and in the direction of the second zone. These tapered regions have the advantageous effect that interfering turbulence outside the actual mixing and evaporation zones may consistently be greatly reduced or prevented entirely. In particular, tapering around the nozzle for the fuel has proven to be very effective. The diameter of the first zone is reduced to a maximum of 85% of the diameter of the evaporation zone.

In advantageous embodiments the first zone of the mixing chamber is constituted as a cyclone separator. This is particularly advantageous when the fuel used contains a certain quantity of hard-to-boil hydrocarbons and minerals. For these fuels, complete evaporation is physically impossible under the general conditions stated. To prevent the unevaporated fuel residues from reaching the catalyst surface of the monolith, i.e. the honeycombed ceramic substrate coated with noble metals, where they would result in poisoning and thus diminished activity, it is important to remove these unevaporated fuel residues from the gas stream. It is preferable to remove these particles before the oxidizing agent is supplied in the second zone.

For this purpose use is made of the dynamic principle, by which centrifugal force, for example in a cyclone separator, may be used to remove unevaporated liquid from a gas stream. However, it has been found that it is not effective to design the first zone as a classical cyclone to which the fuel and steam are both fed in tangentially. At least 3 to 4 cm of free space should remain upstream from the atomizing nozzle to allow evaporation before the fuel droplets reach the wall of the mixing chamber, i.e. the cyclone. To this end, however, the evaporator must have a relatively large design, particularly when the thermal insulation is also taken into account.

In advantageous embodiments of the invention, therefore, the atomizing nozzle for the fuel is situated at the end face of the mixing chamber, on the axis of the mixing chamber, and only the steam feed is tangentially configured. In addition, the opening that represents the outlet from the evaporator, i.e. the transition between the first and second zones, is provided in the direction of the atomizing nozzle such that an annular gap is formed between the wall of the evaporator and the second zone. During operation the unevaporated particles are consistently deflected into this gap by centrifugal force, while the gaseous phase flows centrally from the evaporator into the second zone. The low-volatility particles and deposits that are collected in the gap therefore cannot reach the catalyst, and also do not result in impairment of the rest of the flow.

The fuel feed nozzle (atomizing nozzle) points in the direction of the second zone of the mixing chamber. At that location an oxidizing agent is supplied to the completely evaporated and uniformly distributed fuel. The oxidizing agent is advantageously also fed in the cold state. The supply line for the oxidizing agent has multiple uniformly spaced openings for rapid and uniform distribution of the oxidizing agent. A nozzle ring in particular has been found to be very effective.

The oxidizing agent is supplied shortly before entry into the reforming catalyst. In this manner the amount of time the gaseous fuel is exposed to the oxidizing agent before entering the reforming catalyst may be reduced. The risk of premature combustion or ignition of the fuel-air mixture may thus be consistently reduced or eliminated entirely.

The flow in the mixing chamber is such that the fuel that is mixed with the oxidizing agent is not able to recirculate from the second zone back into the first zone. Thus, the oxygen deficit in the first zone prevents ignition as well as soot formation.

BRIEF DESCRIPTION OF THE DRAWING

The subject matter of the invention is explained in greater detail below with reference to several figures, without thereby limiting the subject matter of the invention. In the following figures.

SPECIFIC DESCRIPTION

In the figures the indicated terms have the following meanings:

C Carbon
$H_2O$ Steam
O Oxidizing agent
K Catalyst
SP Gap for separating liquid fuel particles.

The aim is to provide the starting materials for a reformer by means of exact metering, mixture formation, possible evaporation, and homogeneous flow distribution in the direction of the catalyst device. This is achieved in the mixing chamber according to the invention. As an example, for an ATR having a power rating of 3 $kW_{el}$, 3.6 kg/h air, 1.73 kg/h water, and 800 g/h fuel are introduced into the mixing chamber.

Figure 1:
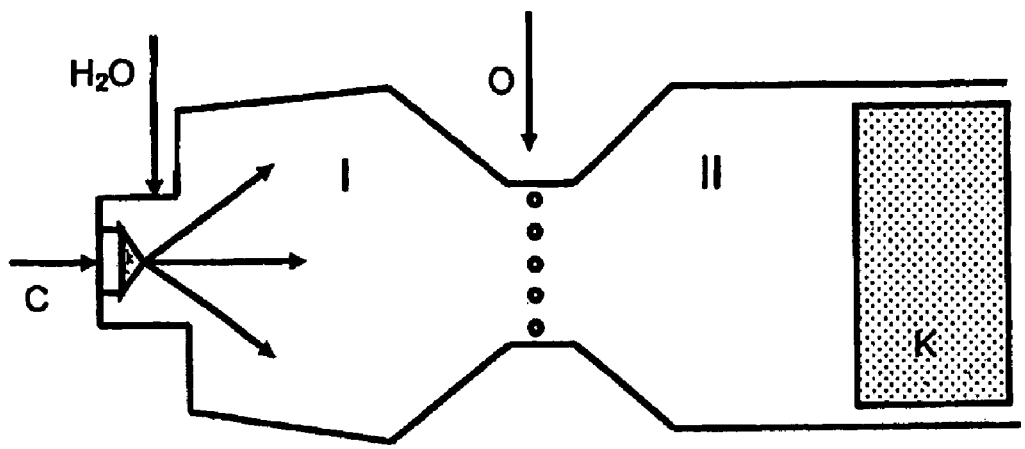
FIG. 1 is a schematic diagram of the mixing chamber according to the invention, comprising a first zone I (evaporator), second zone II, and catalyst device K.

The mixing chamber according to the invention has two zones according to FIG. 1, a catalyst device K, for example in an ATR, generally adjoining the second zone II. The first zone I is intended for evaporating the fuel and mixing with the steam necessary for this purpose.

For effective flow within the mixing chamber, the mixing chamber advantageously has a rotationally symmetrical design, for example shaped as a cylinder. The evaporator zone I (first zone) has a supply line for liquid fuel C and having a nozzle. This nozzle is centrally located on an end face of the mixing chamber so that the jet exiting the nozzle may be distributed uniformly in the mixing chamber and virtually parallel to the axis thereof. A single-component nozzle having a spray angle of approximately 60° is particularly advantageous. The fuel droplets C generated generally have a droplet size of approximately 30 μm. The temperature in the evaporator section is usually set at 400° C.

Although a dual-component nozzle produces a spray profile having very fine droplets, use thereof has proven to be less advantageous or unsuitable. In addition to the relatively high pressure and energy loss of approximately 1 to 2 bar or even more on the gas side, the greatest disadvantage is the temperature sensitivity in the vicinity of 300° C. In addition, there is strong bonding between the liquid and gas flow that makes control more difficult.

The supply line for the steam ($H_2O$) is located adjacent the nozzle for the fuel (atomizing nozzle). The feed occurs via at least one pipe, typically having a diameter of approximately 3 mm to 10 mm and aligned so that the steam emitted from it is aimed directly into the fuel exiting from the nozzle. It is advantageous for the nozzle to be tangentially aligned so that the exiting steam is combined with the exiting fuel in a rotational motion for better intermixing.

In the second zone II of the mixing chamber oxidizing agent O is then supplied to the evaporated $H_2O/C$ gas stream that has been mixed with steam. This occurs through at least one supply line. However, the oxidizing agent is advantageously supplied through multiple supply lines, for example in the form of a nozzle ring. The supply lines may also be advantageously positioned at an angle (up to approximately 15°) from the radial direction.

Figure 2:
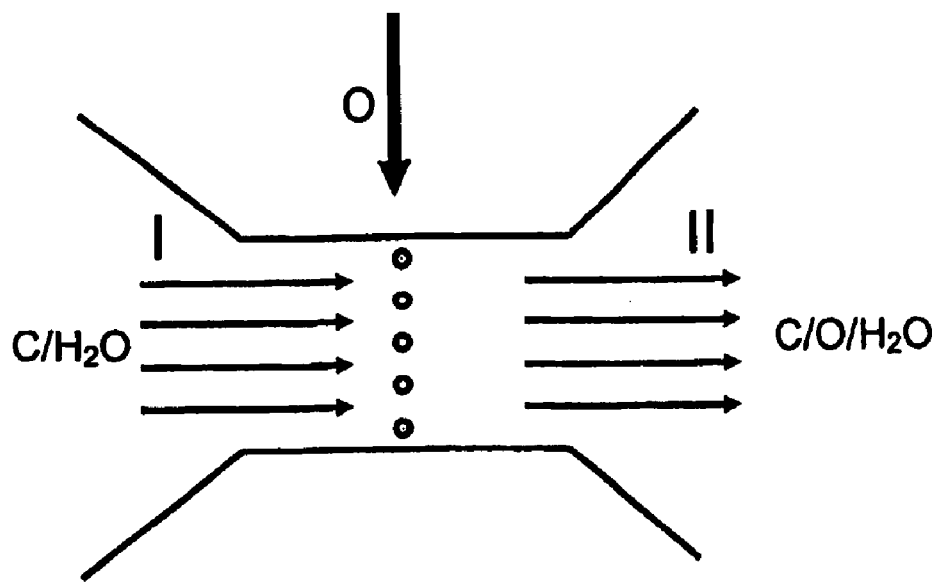
FIG. 2 illustrates the principle of effective feed of oxidizing agent within the second zone.

The oxidizing agent O is advantageously supplied at a restriction between zone I and zone II, as shown in FIG. 2. The distance between the oxidizing agent supply line and the nozzle for the fuel is 75 mm, for example.

Figure 3:
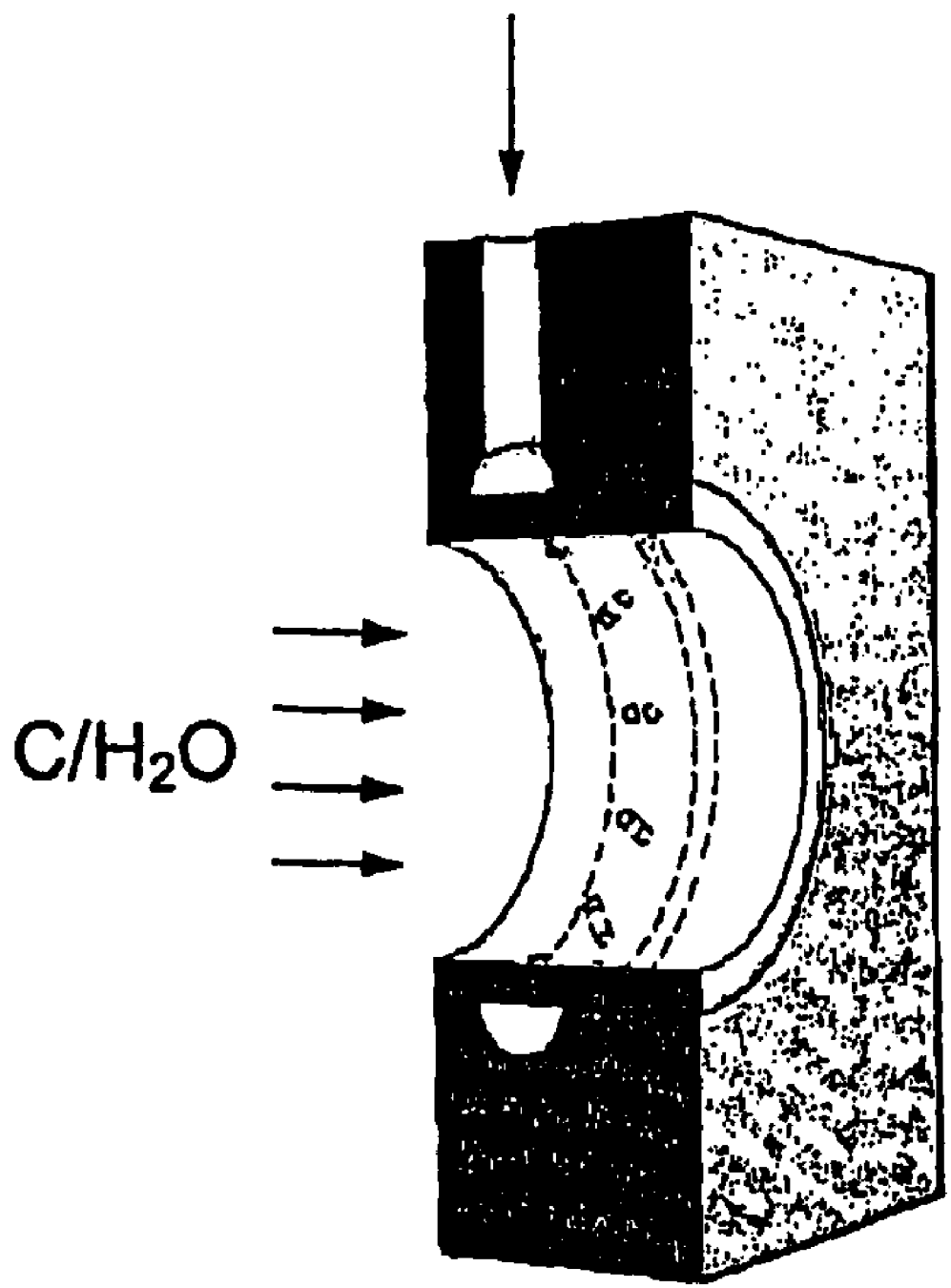
FIG. 3 shows an illustrated embodiment for air feed in the form of a nozzle ring.

FIG. 3 illustrates one advantageous design of the oxidizing agent supply line, in which air is supplied through a pipe. At the restriction a slot in the shape of an annular ring is internally machined into the outer wall and acts as an air distributor connected to the feed pipe. The annular air distributor is protected from the interior by an internal collar. Radial feeding of the oxidizing agent into the interior of the mixing chamber is possible only by means of multiple small holes that extend through the collar to the annular air distributor.

In a further design, the holes in the collar deviate slightly from the radial direction by approximately 5 to 15°. In this manner the oxidizing agent flowing through also has a tangential component which results in more intense turbulent flow, and therefore effective mixing as a rule.

Figure 4:
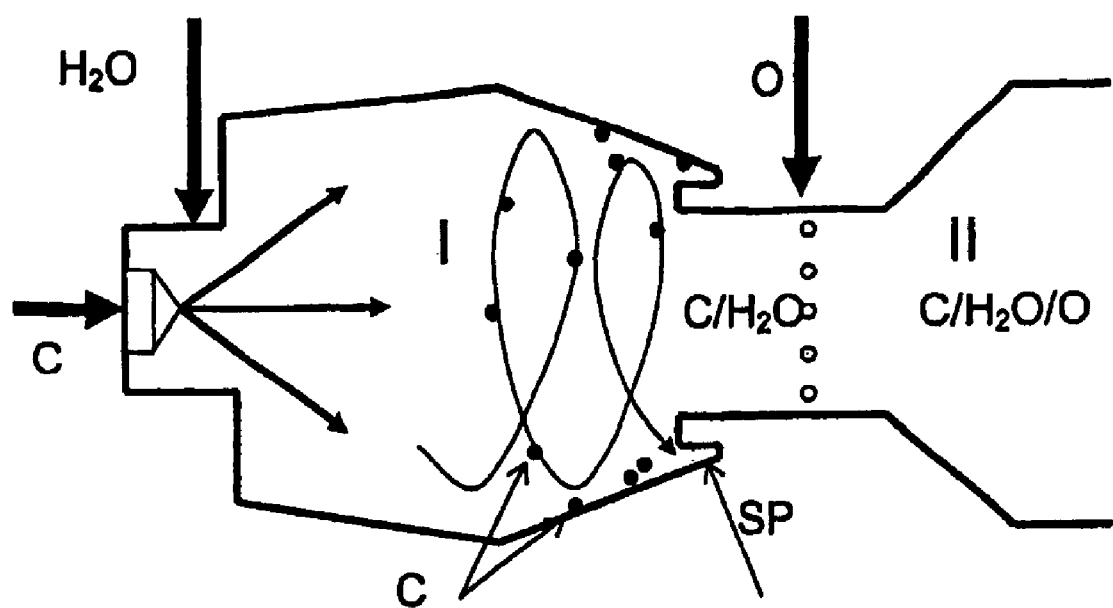
FIG. 4 shows the principle of separation of the unevaporated fuel particles from the gas stream.

FIG. 4 shows the principle of the evaporator zone I designed as a cyclone. The unevaporated fuel droplets are carried by the flow to the outer edge of the chamber and are collected in the gap SP, so that they are unable to pass into the second zone.

Figure 5:
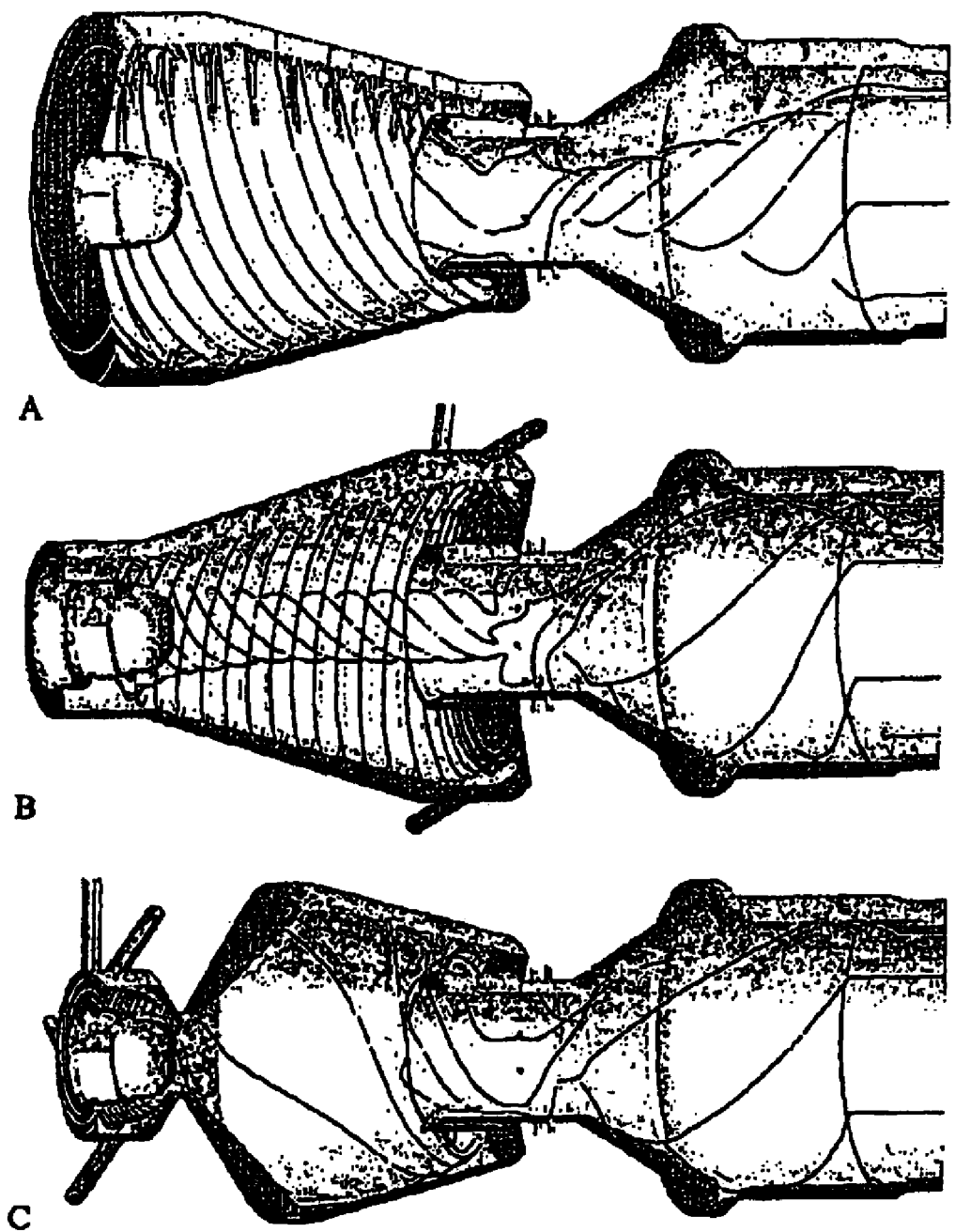
FIG. 5 shows three embodiments of the mixing chamber according to the invention where the first zone I in each case is designed as a cyclone.

FIG. 5 illustrates three different designs of the evaporator section of the mixing chamber designed as a cyclone. The lines indicate the different flow directions inside the evaporators.

The invention claimed is:

1. A method of operating a mixing chamber for a reformer in which a liquid fuel is evaporated and mixed with an oxidizing agent, the method comprising the following steps:
   introducing substantially only the liquid fuel in an axial downstream direction into a first upstream zone of the mixing chamber via a nozzle so as to atomize the liquid fuel,
   separately introducing steam into the upstream zone and contacting the atomized fuel in the upstream zone with the introduced steam to cause the fuel to evaporate, and
   supplying an oxidizing agent downstream of the first zone in a second zone of the mixing chamber to the evaporated fuel and uniformly mixing the oxidizing agent with the evaporated fuel.

2. The method according to preceding claim 1 wherein the supplied steam has a temperature between 350 and 500° C.

3. The method according to claim 1 wherein diesel is the fuel.

4. The method according to claim 1 wherein air is the oxidizing agent.

5. The method according to claim 1 wherein the fuel is atomized axially.

6. The method according to claim 1 wherein the steam is tangentially supplied.

7. The method according to claim 1 wherein the oxidizing agent is tangentially supplied via a nozzle ring.

8. The method according to claim 1 wherein the fuel is supplied at ambient temperature.

9. The method according to claim 1 wherein the oxidizing agent is supplied at ambient temperature.

10. The method according to claim 1 wherein the fuel is introduced into the mixing chamber generally at room temperature.

11. The mixing chamber according to claim 10, the chamber being of a rotationally symmetrical design with an axial supply line for the fuel, at least one tangential supply line for the steam, and at least one radial supply line for the oxidizing agent.

12. The mixing chamber according to claim 10, further comprising
   a nozzle ring for supplying the oxidizing agent.

13. The mixing chamber according to claim 10 wherein the oxidizing agent is supplied in the vicinity of a restriction of flow cross section of the chamber.

14. In a reformer for producing distillates:
   a mixing chamber extending an axis and forming an upstream evaporator zone formed as a cyclone and a downstream oxidizing zone and formed between the zones with an annular gap;
   means for introducing atomized liquid fuel axially in a downstream direction into the evaporator zone;
   means for injecting steam tangentially into the evaporator zone and mixing it with the atomized liquid fuel therein to evaporate the atomized liquid fuel and move the resultant fuel-steam mixture downstream as a cyclone;

means including a nozzle for introducing an oxidizing agent into the oxidizing zone for mixing with the evaporated fuel; and means for injecting an oxidizing agent into the downstream zone and uniformly mixing the oxidizing agent with the mixture therein.

15. A method of operating a mixing chamber for a reformer in which a fuel is evaporated and mixed with an oxidizing agent, the method comprising the following steps:

introducing atomized liquid fuel in an axial downstream direction into a first upstream zone of the mixing chamber via a nozzle, contacting the atomized fuel in the upstream zone with steam that is introduced into the first zone of the mixing chamber to cause the fuel to evaporate and to move cyclonically downstream in the first zone with unevaporated particles moving outward, supplying an oxidizing agent downstream of the first zone in a second zone of the mixing chamber to the evaporated fuel and uniformly mixing the oxidizing agent with the evaporated fuel, and trapping and discharging unevaporated fuel particles in an annular gap between the first and second zones.

* * * * *